3,061,423
GRADUALLY AVAILABLE FERTILIZER
COMPRISING GLYCOLURIL
William F. Symes and Loyal E. Loveless, Webster Groves, Mo., assignors to Monsanto Chemical Company, St. Louis, Mo., a corporation of Delaware
No Drawing. Filed Dec. 21, 1959, Ser. No. 860,671
12 Claims. (Cl. 71—28)

This invention relates to a gradually available nitrogenous fertilizer. More specifically, this invention relates to a novel application of the compound glycoluril

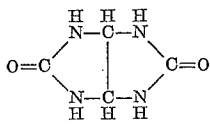

which comprises the application of said glycoluril to the soil wherein it slowly decomposes, making its nitrogen slowly available to living plants.

Most commonly-used fertilizers today contain as their nitrogenous constituent a form of nitrogen which is characterized by being markedly soluble in water. Such materials as ammonium sulphate, ammonium nitrate, urea, and liquid ammonia, etc., are typical examples of the highly soluble forms of nitrogen. Owing to this high solubility, when they are applied to the soil such nitrogenous materials are rapidly leached away with the ground water so that their effect is at best but temporary. Such premature loss of nitrogenous plant food from the plant's root zone is particularly aggravated by an extremely rainy season, or where soils are unusually wet and waterlogged. For example, in some instances as much as 90 percent of the highly soluble type of nitrogen applied to the soil may disappear from the plant root zone in 20 days. The plant root zone is that region of the soil just below the soil surface wherein the roots of most living plants grow. Depending upon the particular plants, this root zone varies in thickness or depth from less than one inch to as much as fifty feet. Generally, the root zone extends from the surface of the soil to 3 to 6 feet below the soil surface.

Through the years many attempts have been made to develop a source of nitrogen, suitable for incorporation into a mixed fertilizer, which would be much less soluble in water, but would nevertheless, eventually make its nitrogen available to plants. Such availability would of necessity be much slower than that from the highly soluble nitrogenous materials discussed above. The most noteworthy of these attempts to develop a slowly available nitrogenous fertilizer was that which resulted in the commercial development of the urea-formaldehyde condensation products.

These urea-formaldehyde condensation products have enjoyed a fairly wide acceptance and use in agriculture because they are not leached quickly from the soil root zones by water. However, urea-formaldehyde products, too, have at least one distinct disadvantage. That is, they release their nitrogen too slowly. The net effect of this too-slow release of nitrogen is that the total fertilizer value of such materials is not realized in a single crop. In order to circumvent the shortcomings of both the highly soluble nitrogen fertilizers and the very slow urea-formaldehyde fertilizers, it was very desirable to invent a process which would make nitrogen available to plants at a rate somewhat intermediate between these extremes.

Accordingly, it is an object of the present invention to provide a novel use for the compound glycoluril

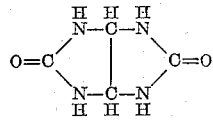

which use comprises the application of the compound to the soil, wherein it has proved to be an exceptionally effective slow-release type nitrogenous fertilizer. A further object is to provide novel fertilizer compositions which are particularly valuable in that they contain as at least part of their nitrogen-bearing portion the compound glycoluril, the function of which is to provide a source of nitrogen which is released slowly and thus is available to plants over a fairly long period of time. An additional object is to provide a source of slowly-released nitrogen which is released at a rate which is desirably slow, in that the nitrogen is not all leached away within a very short time, and yet is not so slow as to require unusually large quantities of fertilizer to maintain a desired level of available nitrogen in the soil. Additional objects of the invention will be apparent from the description which follows.

The present invention is principally predicated upon the discovery that the compound glycoluril

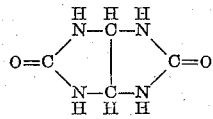

is a surprisingly effective nitrogenous fertilizer, serving as a source of slowly-released nitrogen, and resulting in prolonged availability of nitrogen in the soil for plant use.

The successful use of this compound depends upon its application onto or into the soil root zones in amounts which can practically be utilized by the plants thereafter grown in the treated soil. It should be noted that glycoluril can be applied to the soil either before the plants or seeds are planted or after they have been planted. Thus, the phrase "thereafter growing living plants in the treated soil" refers to both plants already growing in the soil before the treatment (such as turf, shrubs and trees) and plants that are planted subsequent to the treatment, either by seed or by transplantation. Rates of application of glycoluril will be described more fully below.

In applying glycoluril to the soil according to the present invention, the glycoluril is generally applied in quantities of from about 10 to about 3000 pounds per acre, and preferably from about 50 to about 1500 pounds per acre. This upper limit will vary considerably, depending upon the type of plants being fertilized. However, generally, no more glycoluril is applied than can be utilized without such undesirable effects as wilting or burning of the plants.

It is commonly accepted that the application rates or quantities of fertilizers may be described according to the amount of actual nutrient material applied to the soil. For example, the nutrient element in glycoluril is nitrogen (N). By weight, glycoluril contains 39.5% N. Therefore, the limits described above may also be stated as from about 3.95 pounds to about 1185 pounds of N in the form of glycoluril may be applied per acre, and preferably from about 19.75 to about 592.5 pounds of N per acre in this form. The table below utilizes this method of comparing the effects of N added in different forms. The following demonstration illustrates the remarkable results obtained by the practice of the present invention. Since the effect of N in the soil was being studied, equal amounts of N from glycoluril, urea and a typical urea-formaldehyde product were compared.

EXAMPLE 1

Twenty-eight identical 5 inch by 9 inch by 2 inch seed flats were prepared, each containing the same number of Kentucky bluegrass plants. The bluegrass plants were allowed to grow in the greenhouse with daily waterings for 25 days, or until they had essentially depleted the soil of available nitrogen. Then the grass was clipped at a height of 1½ inches. These clippings were discarded. Then to four flats, chosen at random from the group of 28 was added an amount of glycoluril equivalent to an application of 100 pounds of N per acre. The finely-ground compound was sprinkled evenly over the surface of the flats, and then washed into the soil with a gentle stream of water. The same treatment was followed in preparing four replicate flats, applying glycoluril at the equivalent of 300 pounds of N per acre.

Exactly the same method was followed in preparing four replicates each, containing (a) a proprietary urea-formaldehyde product (especially prepared for fertilizers) at a treatment level of 100 pounds of N per acre, (b) the same urea-formaldehyde product at a treatment level of 300 pounds of N per acre, (c) urea (representing the highly soluble form of nitrogen) at a treatment level of 100 pounds of N per acre, and (d) urea at a tretment level of 300 pounds of N per acre. To the remaining four flats was added no nitrogen. These last four then, served as controls for the demonstration.

The 28 flats subsequently received identical treatment throughout the demonstration. After 24 days the grass was again clipped at a height of 1½ inches. These clippings were then dried and weighed. The total N content of the clippings was also determined. Similar clipping and measuring procedures were followed on the 50th, 67th, 82nd, and 115th days after the nitrogenous fertilizers had been applied. From these individual data, the results shown in Table I were compiled. Table I shows that after 115 days at application levels of 100 pounds of N per acre, grass fertilized with the urea-formaldehyde product had grown less than half as much as grass fertilized with either glycoluril or urea. At the 300 pounds of N per acre treatment level the grass fertilized with glycoluril had grown at the remarkable rate of 1.95 times that fertilized by the urea-formaldehyde product and also 1.67 times that fertilized with urea. From the standpoint of nitrogen efficiency, which is defined as the ratio of total nitrogen utilized or absorbed by the plants compared with the total amount of nitrogen applied after correcting for the unfertilized control, the glycoluril is again outstanding. For example, averaging the results from both rates of application, the nitrogen efficiency in 115 days for grass fertilized with glycoluril was 50.4%, while that for urea was 34.1% and for the urea-formaldehyde product, only 16.8%. No deleterious effects to the grass by any of these products was noted.

While Example 1 illustrates the outstanding performance of glycoluril as a nitrogenous fertilizer when used alone, it should be noted that glycoluril is also extremely effective in this application when it is used in combination with other materials which furnish nitrogen to growing plants. The materials which are commonly used with glycoluril are those which furnish the highly soluble forms of nitrogen, described hereinbefore. When glycoluril is used in such combinations with other nitrogenous fertilizing materials, it is usually used in such quantity that the amount of nitrogen (calculated as N) furnished by the glycoluril is greater than one-fourth percent, based on the total weight of the fertilizer composition, but preferably greater than one-half percent on the same basis.

Table I

| Fertilizer | Fertilization Rate-lbs. of N per Acre | Total growth vs. Control [1] after 115 days (g. dry weight) | Percent Total N recovered after 115 days |
|---|---|---|---|
| Glycoluril | 100 | 3.737 | 53.3 |
|  | 300 | 9.463 | 47.4 |
| Urea-formaldehyde proprietary product | 100 | 1.571 | 13.3 |
|  | 300 | 4.838 | 20.2 |
| Urea | 100 | 3.760 | 44.7 |
|  | 300 | 5.669 | 23.5 |

[1] (Total dry weight of fertilized grass)—(total dry weight of unfertilized control.)

While the above example shows that glycoluril applied alone to soils as a source of slowly available nitrogenous fertilizer is particularly outstanding, the compound is similarly outstanding in this application when applied with other sources of available nitrogen, such as those which are markedly soluble in water, described above, and also as a component of a mixed or "balanced' fertilizer, wherein, in addition to nitrogen, the composition contains P and/or K in available form.

In fertilizer parlance, the three major nutrient or plant food requirements for living plants are nitrogen (N), phosphorus (P), and potassium (K), which are calculated as N, $P_2O_5$ and $K_2O$, respectively. For a great many uses it is desirable to furnish at least two of these major nutrients in a single fertilizer application. For such, then, the appropriate quantities of N and P and/or K are blended with or without a diluent base such as dolomite to give the desired quantities of each nutrient in the final "mixed" fertilizer. The term "mixed fertilizer" in the trade has many diverse definitions. However, for the purpose at hand, "mixed fertilizer" means a fertilizer which contains more than one of the three major nutrients, N, P and K, in the same fertilizer composition. This definition is the one given on page 433, volume 6 of Elsevier's "Encyclopedia of Chemical Technology," published by Interscience Publishers, Inc. (1951). For example, the term "mixed fertilizer" includes such formulations as 8–24–0 (comprising 8% N, 24% $P_2O_5$, 0% $K_2O$), 12–0–12 (12% N, 0% $P_2O_5$, 12% $K_2O$), 5–10–5 (5% N, 10% $P_2O_5$, 5% $K_2O$), and 10–10–10 (10% N, 10% $P_2O_5$, 10% $K_2O$).

Glycoluril can be advantageously formulated into such mixed plant foods or fertilizers by combining it with fertilizer ingredients which will furnish P and/or K and/or additional N in an "available" form. By "available" is meant a form which can be utilized by the living plants. While any ingredients which can furnish N and/or P and/or K in an "available" form may be formulated with glycoluril, the following are examples of typical fertilizer ingredients: ammonium nitrate, urea, sodium phosphates such as monosodium phosphate or disodium phosphate, sodium tripolyphosphate, calcium phosphates, superphosphate, triple superphosphate, potassium phosphates such as monopotassium phosphate, dipotassium phosphate, or tetrapotassium pyrophosphate, potassium sulfate, ammonium sulphate, sodium nitrate, potassium nitrate, dipotassium carbonate, monoammonium phosphate, diammonium phosphate, muriate of potash (KCl) and calcium nitrate, etc.

Such examples are offered merely as a guide for formulating a mixed fertilizer containing glycoluril. It is not the intention of the inventors that this invention be limited only to these examples.

EXAMPLE 2

A typical mixed fertilizer containing N, P and K in the ratio of 5–10–5, calculated as N–$P_2O_5$–$K_2O$, is prepared by blending glycoluril with a P-containing compound, trisodium phosphate, and a K-containing compound, dipotassium carbonate, plus dolomite filler as follows.

| Compound: | Wt. percent |
|---|---|
| Glycoluril | 12.7 |
| Trisodium phosphate | 23.1 |
| Dipotassium carbonate | 7.3 |
| Dolomite | 56.9 |

EXAMPLE 3

Another typical fertilizer containing N, P and K in the ratio of 5–10–5, calculated as $N-P_2O_5-K_2O$, is prepared by blending glycoluril with a P-containing compound, triple superphosphate, and a K-containing compound, muriate of potash (KCl), plus dolomite filler as follows.

| Compound: | Wt. percent |
|---|---|
| Glycoluril | 12.7 |
| Triple superphosphate | 18.2 |
| Muriate of potash | 8.3 |
| Dolomite | 60.8 |

EXAMPLE 4

A typical mixed fertilizer containing only N and P in the ratio of 8–24–0, calculated as $N-P_2O_5-K_2O$, is prepared by blending glycoluril with a P-containing compound, monocalcium phosphate, and dolomite filler as follows.

| Compound: | Wt. percent |
|---|---|
| Glycoluril | 20.3 |
| Monocalcium phosphate | 43.8 |
| Dolomite | 35.9 |

EXAMPLE 5

A typical mixed fertilizer containing only N and K in the ratio of 12–0–12, calculated as $N-P_2O_5-K_2O$, is prepared by blending glycouril with a K-containing compound dipotassium carbonate, and sand filler as follows.

| Compound: | Wt. percent |
|---|---|
| Glycoluril | 30.5 |
| Potassium sulfate | 22.2 |
| Sand | 47.3 |

EXAMPLE 6

A typical mixed fertilizer containing N, P and K in the ratio of 5–10–5, calculated as $N-P_2O_5-K_2O$, wherein only part of the total N is derived from glycoluril, is prepared by blending glycoluril with another N-containing compound, urea, plus a P-containing compound. trisodium phosphate, plus a K-containing compound, dipotassium carbonate, plus dolomite filler as follows.

| Compound: | Wt. percent |
|---|---|
| Glycoluril | 6.35 |
| Urea | 5.43 |
| Trisodium phosphate | 23.1 |
| Dipotassium carbonate | 7.3 |
| Dolomite | 57.82 |

In general, each nutrient element which is present in any particular formulation, is present in a quantity equal to at least about one-half percent of the total mixed fertilizer composition, calculated as N, or $P_2O_5$, or $K_2O$. For example, a mixed fertilizer containing the three nutrient elements, N, P and K contains at least about one-half percent of N (calculated as N), at least about one-half percent of P (calculated as $P_2O_5$), and at least about one-half percent of K (calculated as $K_2O$). A mixed fertilizer containing only the nutrient elements N and P contains at least about one-half percent of N (calculated as N) and at least about one-half percent of P (calculated as $P_2O_5$).

The non-nutrient portion of this type of mixed fertilizer composition may be made up of one or more of several commonly used fertilizer fillers such as dolomite, sand, peanut shells, etc.

It is within the scope of this invention to treat soils where all types of plants may be grown via the manner herein described. For example, plants which may be treated include the grasses such as home lawns and farm forage crops as well as grass-type crops such as corn, wheat and rye. It is also desirable to treat soils in which flowers and vegetables are to be grown or are growing. Flowering shrubs, evergreen shrubs, and hedge plants may also be grown in the treated soil. In addition, soils may be treated to improve the growth and health of trees. This includes not only individual trees, but also large groups of trees such as windbreaks and even forests.

The desired results, following the teachings of the present invention, are best experienced when the glycoluril is dispersed evenly over the surface or mixed evenly into the root zones of the soil being treated. The actual method of achieving the desired even application may be attained in any of a number of methods presently available. For example, for the application of glycoluril to turf, the common fertilizer spreader, containing holes equally spaced across the bottom of the spreader through which the fertilizer falls onto the soil, is quite satisfactory. For smaller areas, such as a home vegetable or flower garden, or around individual shrubs and trees, spreading by hand will suffice. For larger areas, such as farms, forests, etc., large mechanical spreaders or even airplanes may be utilized. In order to distribute the glycoluril more evenly through the root zones, it may be desirable to spread it over the soil surface before the soil is tilled. Another method would be by means of the seed drill in conjunction with planting.

Obviously, modifications and variations of the invention as hereinbefore set forth may be made without departing from the spirit and scope thereof. Therefore only such limitations should be imposed as are indicated in the appended claims.

What is claimed is:

1. A method of fertilizing living plants with a source of slowly available nitrogen which comprises applying glycoluril,

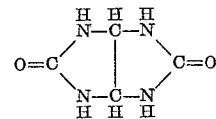

to the soil and thereafter growing plants in the treated soil.

2. The process of claim 1 wherein the glycoluril is applied to the soil at a rate of from about 10 to about 3000 pounds per acre.

3. The process of claim 1 wherein the glycoluril is applied to the soil at a rate of from about 50 to about 1500 pounds per acre.

4. The process of claim 1 wherein the glycoluril is applied as a constituent of a fertilizer composition containing glycoluril, and at least one other nitrogenous compound supplying nitrogen in a form which is utilized by growing plants, said fertilizer composition containing ingredients supplying nitrogen, calculated as N, in such quantities that the total N is equal to at least about one-half percent of the total weight of said fertilizer composition. and the amount of N furnished by said glycoluril is equal to at least about one-fourth percent of the total weight of said fertilizer composition.

5. The process of claim 1 wherein the glycoluril is applied as a constituent of a mixed fertilizer, said mixed fertilizer containing ingredients supplying nitrogen, phosphorus, and potassium, calculated as N, $P_2O_5$, and $K_2O$, respectively, in such quantities that the fraction of the N in said fertilizer furnished by said glycoluril, the $P_2O_5$, and the $K_2O$ are each equal to at least about one-half percent of the total weight of said mixed fertilizer.

6. The process of claim 1 wherein the glycoluril is applied as a constituent of a mixed fertilizer, said mixed fertilizer containing ingredients supplying nitrogen and phosphorus, calculated as N and $P_2O_5$, respectively, in such quantities that the fraction of the N in said fertilizer furnished by said glycoluril and the $P_2O_5$ are each equal to at least about one-half percent of the total weight of said mixed fertilizer.

7. The process of claim 1 wherein the glycoluril is applied as a constituent of a mixed fertilizer, said mixed fertilizer containing ingredients supplying nitrogen and potassium, calculated as N and $K_2O$, respectively, in such quantities that the fraction of the N in said fertilizer furnished by said glycoluril and the $K_2O$ are each equal to at least about one-half percent of the total weight of said mixed fertilizer.

8. A mixed fertilizer containing glycoluril and ingredients supplying phosphorus and potassium, calculated as $P_2O_5$ and $K_2O$, respectively, in such quantities that the amount of nitrogen in said fertilizer furnished by said glycoluril, the $P_2O_5$, and the $K_2O$ are each equal to at least about one-half percent of the total weight of said mixed fertilizer.

9. A mixed fertilizer containing glycoluril and at least one ingredient supplying phosphorus, calculated as $P_2O_5$, in such quantities that the amount of nitrogen in said fertilizer furnished by said glycoluril and $P_2O_5$ are each equal to at least about one-half percent of the total weight of said mixed fertilizer.

10. A mixed fertilizer containing glycoluril and at least one ingredient supplying potassium, calculated as $K_2O$, in such quantities that the amount of nitrogen in said fertilizer furnished by said glycoluril and $K_2O$ are each equal to at least about one-half percent of the total weight of said mixed fertilizer.

11. A fertilizer composition containing glycoluril, and at least one other nitrogenous compound supplying nitrogen, calculated as N, in a form which is utilized by growing plants, in such quantities that the total N is equal to at least about one-half percent of the total of said fertilizer composition and the amount of N furnished by said glycolouril is equal to at least about one-fourth percent of the total weight of said fertilizer composition.

12. A method of fertilizing living plants which comprises applying to a soil an amount of a fertilizer composition containing glycoluril and at least one other nitrogenous compound which will supply nitrogen to said plants in a form which can be utilized by them and thereafter growing living plants in said soil, the ratio of said nitrogenous compound to said glycoluril being such that at least 0.5% of the total nitrogen in said composition is in the form of glycoluril, and said amount being sufficient to supply to said soil between about 3.95 and about 1185 pounds of nitrogen in the form of glycoluril per acre, and said amount being insufficient to cause burning of said plants.

References Cited in the file of this patent

UNITED STATES PATENTS

| | | |
|---|---|---|
| 2,255,027 | Keenen et al. | Sept. 2, 1941 |
| 2,618,546 | Davenport | Nov. 18, 1952 |
| 2,806,854 | Cook et al. | Sept. 17, 1957 |
| 2,882,141 | O'Donnell | Apr. 14, 1959 |

OTHER REFERENCES

King: "Insecticides and Repellents," U.S. Dept. of Agriculture Handbook No. 69, May 1954, pages 1, 2, 182 and 183.